US012603348B2

(12) United States Patent
Lee et al.

(10) Patent No.: US 12,603,348 B2
(45) Date of Patent: Apr. 14, 2026

(54) SECONDARY BATTERY HAVING AN INSULATION MEMBER

(71) Applicant: Samsung SDI Co., Ltd., Yongin-si (KR)

(72) Inventors: Hyun Soo Lee, Yongin-si (KR); Jun Sun Yong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 724 days.

(21) Appl. No.: 17/901,574

(22) Filed: Sep. 1, 2022

(65) Prior Publication Data

US 2023/0231220 A1     Jul. 20, 2023

(30) Foreign Application Priority Data

Jan. 18, 2022     (KR) ........................ 10-2022-0007197

(51) Int. Cl.
| *H01M 10/653* | (2014.01) |
| *H01M 10/04* | (2006.01) |
| *H01M 50/103* | (2021.01) |
| *H01M 50/166* | (2021.01) |
| *H01M 50/183* | (2021.01) |

(52) U.S. Cl.
CPC ..... *H01M 10/653* (2015.04); *H01M 10/0413* (2013.01); *H01M 50/103* (2021.01); *H01M 50/166* (2021.01); *H01M 50/183* (2021.01)

(58) Field of Classification Search
CPC ........... H01M 10/653; H01M 10/0413; H01M 50/183; H01M 50/103; H01M 50/166
See application file for complete search history.

(56) References Cited

FOREIGN PATENT DOCUMENTS

| CN | 111066171 A | * | 4/2020 | ......... H01M 10/651 |
| EP | 3174126 A1 | * | 5/2017 | ........ H01M 10/0431 |
| JP | 4855712 B2 | | 1/2012 | |
| KR | 10-2178726 B1 | | 11/2020 | |
| KR | 10-2021-0023793 A | | 3/2021 | |

OTHER PUBLICATIONS

CN 111066171 English Translation (Year: 2020).*
EP 3174126 (Year: 2017).*
Extended European Search Report issued in corresponding EP Application No. 23150454.9, dated Jun. 15, 2023, 10 pages.

* cited by examiner

*Primary Examiner* — Jimmy Vo

(74) *Attorney, Agent, or Firm* — Womble Bond Dickinson (US) LLP

(57)     ABSTRACT

A secondary battery includes: an electrode assembly; a case accommodating the electrode assembly, the case having a bottom surface and long and short sidewalls that extend upwardly from the bottom surface; a cap plate coupled to an upper portion of the case and sealing the case; and an insulation member attached to an outer surface of the case. The insulation member includes a first layer in contact with the outer surface of the case and made of a heat-resistant material, a third layer exposed to the outside and made of a stretchable material, and a second layer between the first and third layers and made of an insulating material.

8 Claims, 10 Drawing Sheets

SECONDARY BATTERY HAVING AN INSULATION MEMBER

CROSS-REFERENCE TO RELATED APPLICATION

This application claims priority to and the benefit of Korean Patent Application No. 10-2022-0007197, filed on Jan. 18, 2022, in the Korean Intellectual Property Office, the entire content of which is herein incorporated by reference.

BACKGROUND

1. Field

Aspects of embodiments of the present disclosure relate to a secondary battery and a method of manufacturing the same.

2. Description of the Related Art

Different from a primary battery that is not designed to be charged (or recharged), a secondary battery is a rechargeable and dischargeable battery. A low-capacity secondary battery comprised of a single cell packaged in the form of a pack may be used for various portable small-sized electronic devices, such as cellular phones or camcorders, while a high-capacity secondary battery in which several tens of cells are connected together in a battery pack is widely used as a power source for driving motors, such as those in hybrid vehicles or electric vehicles.

Secondary batteries may be classified as a circular (or cylindrical) type, a prismatic type, or a pouch type according to its shape. For example, a prismatic secondary battery may be configured by including an electrode assembly stacked or wound with a separator interposed between positive and negative plates in a case with an electrolyte and by installing a cap plate in (or on) the case. In addition, an insulation member may be attached to an outer surface of the case to insulate the case.

The above information disclosed in this Background section is for enhancement of understanding of the background of the present disclosure, and therefore, it may contain information that does not constitute prior art.

SUMMARY

Embodiments of the present disclosure provide a secondary battery exhibiting improved safety and that secures a manufacturing process margin, and a method of manufacturing the same.

A secondary battery according to an embodiment of the present disclosure includes: an electrode assembly; a case accommodating the electrode assembly; a cap plate coupled to and sealing an upper portion of the case, the case has a bottom surface and long and short sidewalls that extend upwardly from the bottom surface; and an insulation member attached to an outer surface of the case. The insulation member includes a first layer in contact with an outer surface of the case and made of a heat-resistant material, a third layer exposed to the outside and made of a stretchable material, and a second layer between the first and third layers and made of an insulating material.

The insulation member may have a first region and a second region that cover the long sidewalls of the case and a third region between the first region and the second region and covering the bottom surface of the case.

The first region may have a first sidewall extension part extending to one of the short sidewalls of the case, the second region may have a second sidewall extension part extending to the one of the short sidewalls of the case, and the third region may have a third sidewall extension part extending to the one of the short sidewalls of the case.

A portion of the one of the short sidewalls of the case may be overlapped and covered by the first sidewall extension part, the second sidewall extension part, and the third sidewall extension part.

The third sidewall extension part may have a cut portion including two slits spaced apart from each other.

The cut portion may be spaced apart from an interface between the first sidewall extension part and the third sidewall extension part and an interface between the second sidewall extension part and the third sidewall extension part.

The first region may have a first upper extension part extending to the cap plate, and the second region may have a second upper extension part extending to the cap plate.

A method of manufacturing a secondary battery according to an embodiment of the present disclosure includes: attaching an insulation member to an outer surface of a case, the case having an electrode assembly accommodated therein and sealed with a cap plate at a top portion thereof and has a bottom surface and long and short sidewalls that extend upwardly from the bottom surface, the insulation member having a first region, a second region, and a third region between the first region and the second region. The attaching of the insulation member to the outer surface of the case includes: bringing the bottom surface of the case into contact with the third region; bending the first region and the second region to cover the long sidewalls of the case; bending a first sidewall extension part of the first region and a second sidewall extension part of the second region to cover the short sidewalls of the case; bending a third sidewall extension part of the third region to cover the short sidewalls of the case; and bending a first upper extension part of the first region and a second upper extension part of the second region to cover an edge of the cap plate.

The insulation member may have a cut portion including two slits spaced apart from each other in the third sidewall extension part, and the cut portion may be spaced apart from an interface between the first sidewall extension part and the third sidewall extension part and an interface between the second sidewall extension part and the third sidewall extension part.

An exterior region of the cut portion in the third sidewall extension part may be bent together with the first sidewall extension part and the second sidewall extension part.

The insulation member may include a first layer in contact with the outer surface of the case and made of a heat-resistant material, a third layer exposed to the outside and made of a stretchable material, and a second layer between the first and third layers and made of an insulating material.

DETAILED DESCRIPTION

Figure 1:
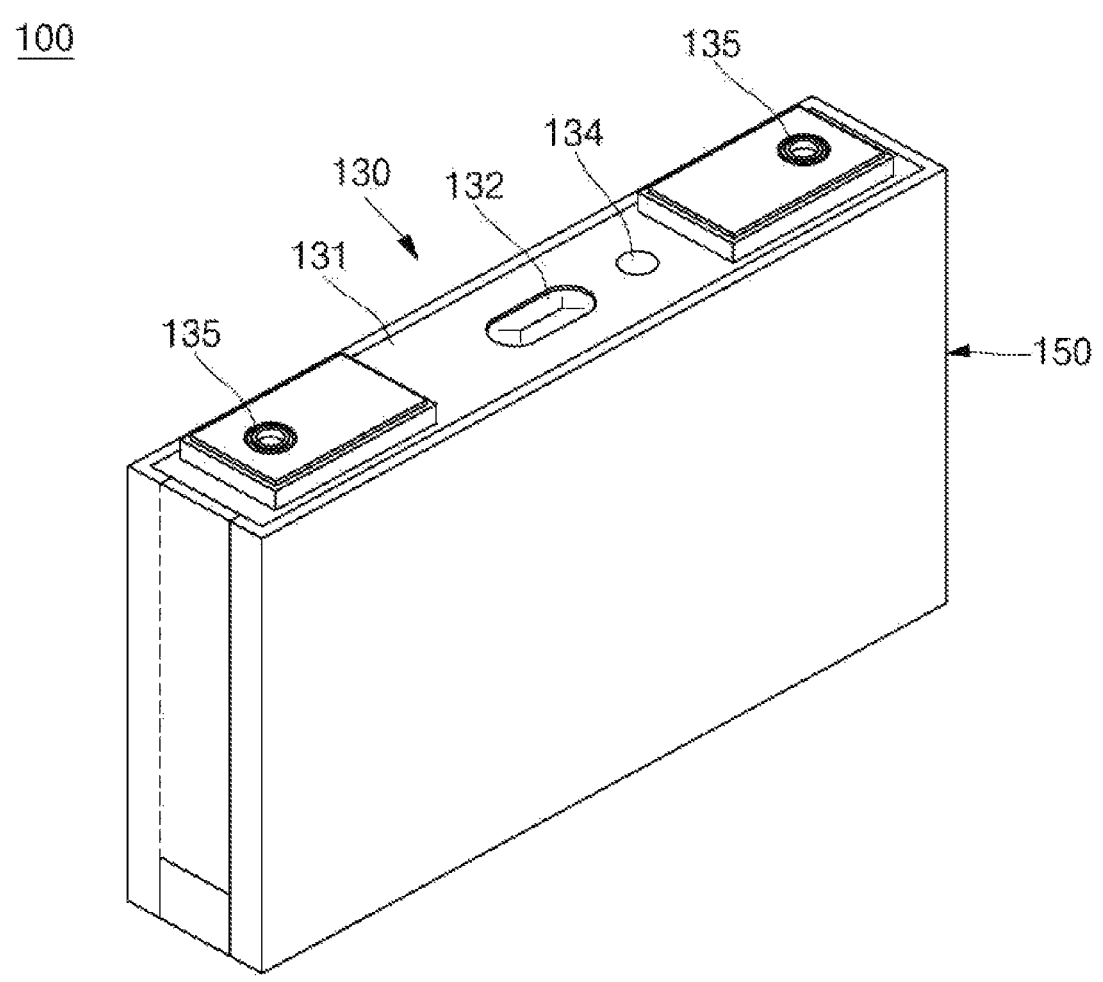
FIG. 1 is a perspective view of a secondary battery according to an embodiment of the present disclosure.

Hereinafter, embodiments of the present disclosure will be described, in detail, with reference to the accompanying drawings.

Example embodiments of the present disclosure are provided to more completely explain the present disclosure to those skilled in the art, and the following examples may be modified in various other forms. In other words, the present disclosure may be embodied in many different forms and should not be construed as being limited to the example embodiments set forth herein. Rather, these example embodiments are provided so that this disclosure will be thorough and complete and will fully convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing particular embodiments only and is not intended to be limiting of the disclosure. As used herein, the singular forms are intended to include the plural forms as well, unless the context clearly indicates otherwise. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

It will be understood that, although the terms first, second, etc. may be used herein to describe various members, elements, regions, layers, and/or sections, these members, elements, regions, layers, and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
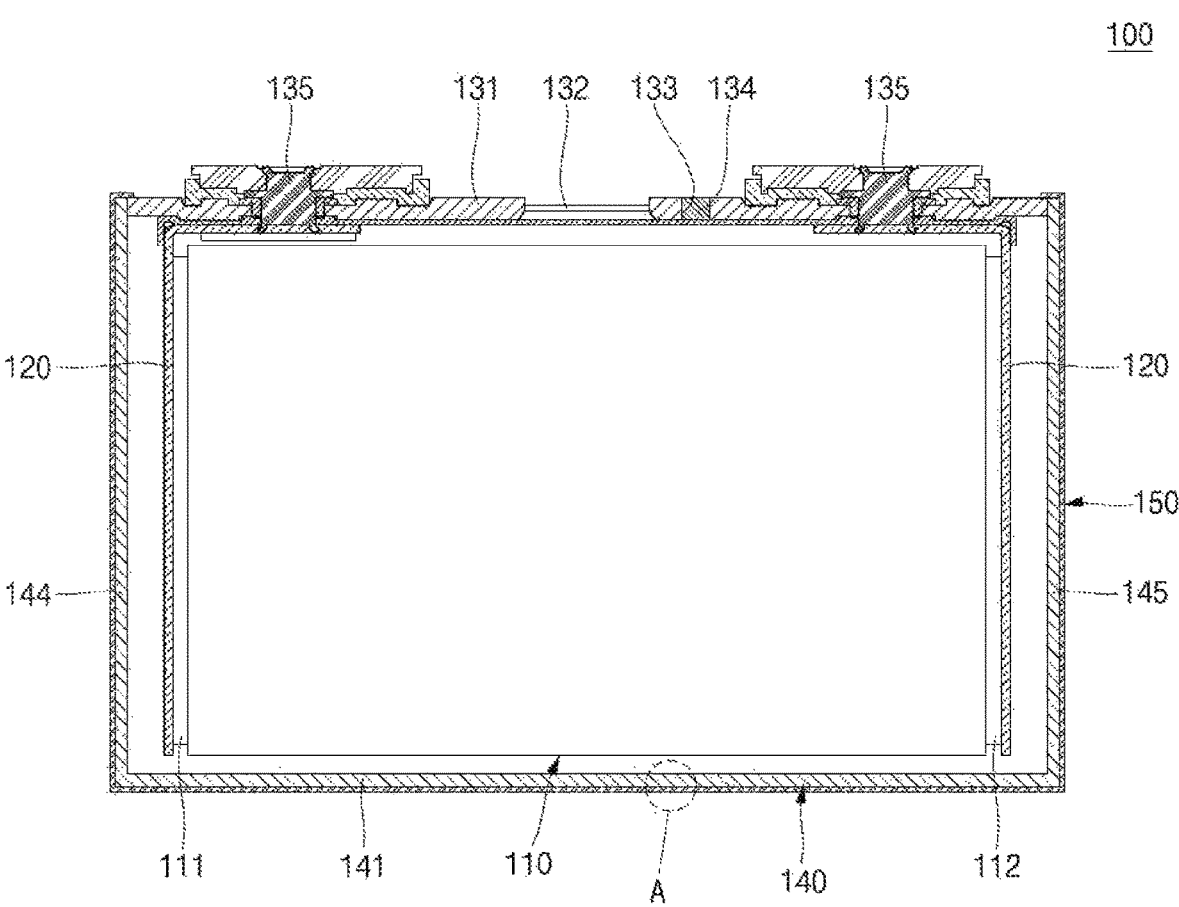
FIG. 2 is a cross-sectional view of a secondary battery according to an embodiment of the present disclosure.
Figure 3:
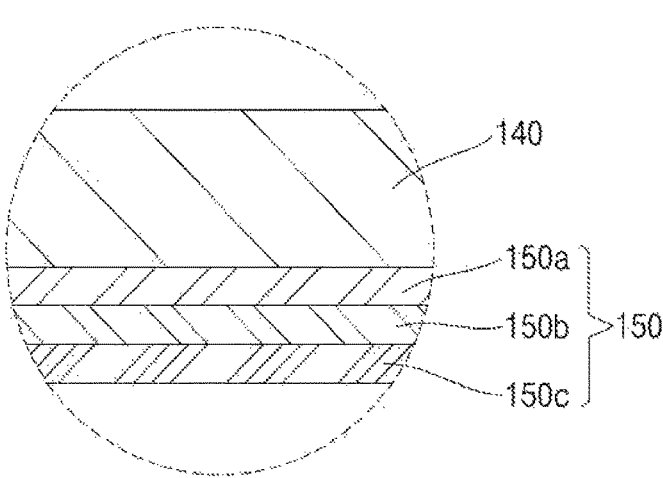
FIG. 3 is an enlarged cross-sectional view of the portion A of FIG. 2.
Figure 4:
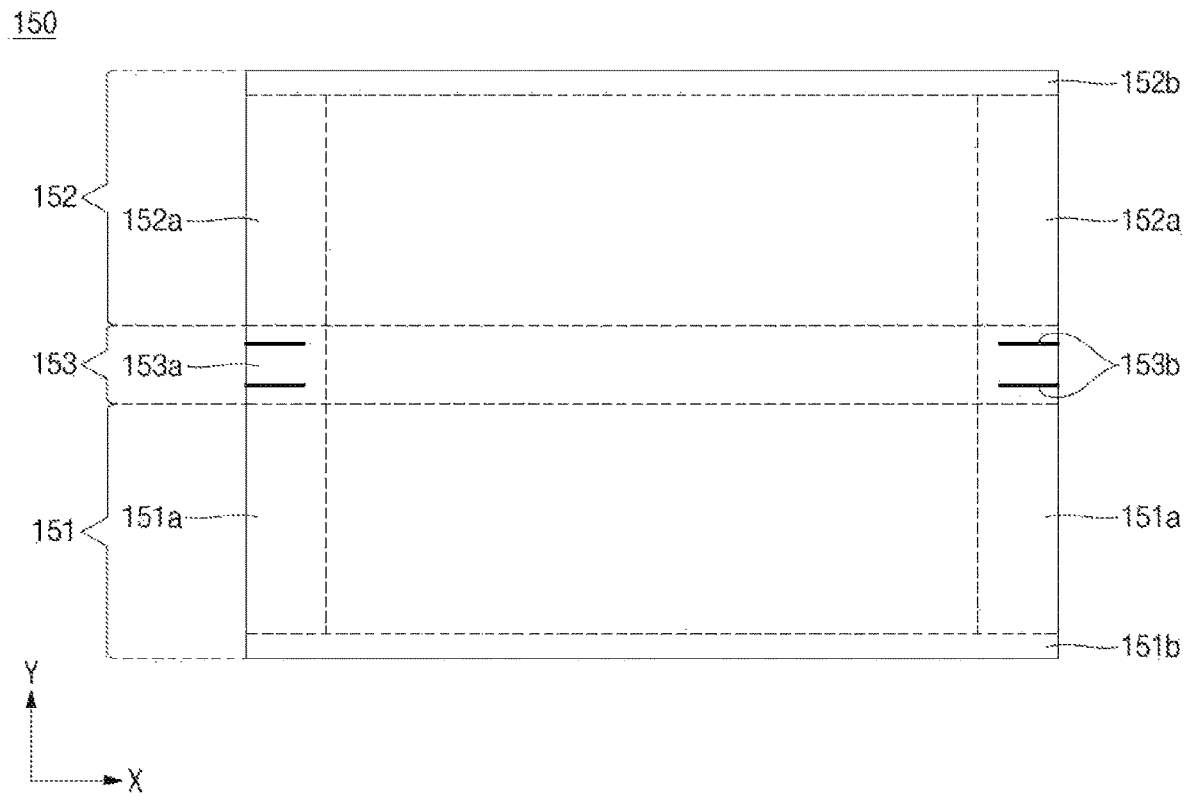
FIG. 4 is a plan view showing an insulation member shown in FIG. 1.

FIG. 1 is a perspective view of a secondary battery according to an embodiment of the present disclosure, FIG. 2 is a cross-sectional view of the secondary battery shown in FIG.1, FIG. 3 is an enlarged cross-sectional view of the portion A of FIG. 2, and FIG. 4 is a plan view showing an insulation member shown in FIG. 1.

Referring to FIGS. 1 to 4, the secondary battery 100 according to the embodiment of the present disclosure includes an electrode assembly 110, a current collector plate 120, a cap assembly 130, a case 140, and an insulation member 150.

The electrode assembly 110 is formed by stacking or winding a laminate of a first electrode plate, a separator, and a second electrode plate, which are shaped as thin plates or layers. In some embodiments, the first electrode plate may be a negative electrode and the second electrode plate may be a positive electrode, but the present disclosure is not limited thereto.

The first electrode plate is formed by coating a first electrode active material, such as graphite or carbon, on a first electrode current collector plate formed of a metal foil, such as copper or nickel, and includes a first electrode uncoated portion that is a region to which the first active material is not applied. The first electrode uncoated portion provides a passage for current flow between the first electrode plate and the outside (e.g., the terminal).

In addition, the first electrode plate uncoated portion may form a first current collecting tab 111. The first current collecting tab 111 may include a plurality of first current collecting tabs, which are formed to protrude from the first electrode plate. In a stacked structure, the first current collecting tab 111 may be formed to protrude from the first electrode plate in a direction (e.g., a predetermined direction) and overlap at one side. In addition, in a winding structure, the first current collecting tab 111 may be formed by placing the uncoated portion at a reference (e.g., a pre-calculated or predetermined) distance from the first electrode plate to allow the first current collecting tabs 111 to protrude from the same region after being wound, and then overlapping the same.

The second electrode plate is formed by coating a second electrode active material, such as a transition metal oxide, on a second electrode current collector plate formed of a metal foil, such as aluminum, and includes a second electrode uncoated portion that is a region to which the second active material is not applied.

In addition, a second current collecting tab 112 may be formed from the uncoated portion of the second electrode plate to correspond to the first current collecting tab 111. Accordingly, the second current collecting tab 112 also has a multi-tab structure, similar to the first current collecting tab 111. The second current collecting tab 112 may protrude in a direction opposite to that of the first current collecting tab 111.

The separator is positioned (or arranged) between the first electrode plate and the second electrode plate to prevent a short circuit and to enable movement of lithium ions. The separator may be made of polyethylene or polypropylene or may be a composite film of polyethylene and polypropylene.

The electrode assembly 110 may be accommodated in the case 140 together with the electrolyte. The electrolyte may be formed of a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). In addition, the electrolyte may be in a liquid, solid, or gel phase. In addition, the first current collecting tab 111 and the second current collecting tab 112 are electrically connected to the current collector plate 120.

The current collector plate 120 includes a pair of current collector plates and is electrically connected to each of the first current collecting tab 111 and the second current collecting tab 112 of the electrode assembly 110. For example, the current collector plate 120 that is electrically connected to the first current collecting tab 111 may have a negative polarity, and the current collector plate 120 that is electrically connected to the second current collecting tab 112 may have a positive polarity depending on the polarity of the first and second current collecting tabs 111 and 112.

The cap assembly 130 may be formed on the electrode assembly 110 and may be coupled to the case 140 to seal the case 140. The cap assembly 130 may include a cap plate 131 and an electrode terminal 135.

The cap plate 131, which may have a plate shape, may be coupled to an opening in the case 140 and may be formed of the same material as the case 140. The cap plate 131 may be coupled to the case 140 by, for example, laser welding. In some embodiments, the cap plate 131 may be electrically connected to the second current collecting tab 112. In such an embodiment, the cap plate 131 and the case 140 may have the same polarity (e.g., positive polarity). Of course, the cap plate 131 may also be electrically connected to the first current collecting tab 111.

The cap plate 131 may include a safety vent 132 having a relatively small thickness compared to other regions of the cap plate 121, and an electrolyte injection hole (e.g., an electrolyte injection opening) 133 for injecting an electrolyte into the case 140. The electrolyte injection hole 133 may be sealed by a stopper 134 after the electrolyte is injected into the case 140.

Electrode terminals 135 may pass through the cap plate 131 at opposite sides (or ends) thereof and may be electrically connected to the current collector plate 120. In some embodiments, the electrode terminal 135 connected to the current collector plate 120, which is coupled to the first current collecting tab 111, may have negative polarity, and the electrode terminal 135 connected to the current collector plate 120, which is coupled to the second current collecting tab 112, may have positive polarity.

The case 140 may have a substantially hexahedron shape having an opening through which the electrode assembly 110 can be inserted to be accommodated therein. The case 140 may have a substantially rectangular bottom surface 141, long sidewalls 142 and 143, and short sidewalls 144 and 145 that extend a length (e.g., a predetermined length) upwardly from the bottom surface 141. The long sidewalls 142 and 143 and the short sidewalls 144 and 145 may include each pair of sidewalls facing each other.

In some embodiments, the case 140 may be made of steel, a steel alloy, nickel plated steel, a nickel plated steel alloy, aluminum, or an aluminum alloy. The inner surface of the case 140 may be insulated to prevent an electrical short from occurring therein. In some embodiments, the case 140 may be electrically connected to one electrode of the electrode assembly 110 through the cap plate 131.

The insulation member 150 may be attached to, adhered to, in close contact with, in contact with, or coupled to an outer surface of the case 140. In some embodiments, the insulation member 150 may include or may be an insulating tape, a sheathing tape, or a finishing tape.

The insulation member 150 may cover the bottom surface 141, the long sidewalls 142 and 143, and the short sidewalls 144 and 145 of the case 140. In some embodiments, the insulation member 150 may extend to the cap plate 131 to cover the edge of the cap plate 131. In some embodiments, the insulation member 150 may cover the interface (e.g., a welding portion) between the cap plate 131 and the case 140. In some embodiments, the insulation member 150 may insulate the case 140 and an external device from each other.

The insulation member 150 may include a first layer 150a in contact with the case 140, a third layer 150c exposed to the outside, and a second layer 150b interposed between the first layer 150a and the third layer 150c.

The first layer 150a may include a heat-resistant material. In some embodiments, the first layer 150a may include polyimide (PI) or polyether ether ketone (PEEK) as the high heat-resistant material. The first layer 150a is the innermost layer and may be in direct contact with the case 140. The first layer 150a may prevent the insulation member 150 from being deformed by heat generated in the case 140. In some embodiments, the first layer 150a may be vicious and/or may be to attach the insulation member 150 to the case 140.

The second layer 150b may include an insulating material. In some embodiments, the second layer 150b may include polyethylene terephthalate (PET), polybutylene terephthalate (PBT), or polyphenylene sulfide (PPS) as the insulating material. The second layer 150b is positioned (or arranged) between the first layer 150a and the third layer 150c and may strengthen the insulating properties of the case 140.

The third layer 150c may include a stretchable material. In some embodiments, the third layer 150c may include oriented poly propylene (OPP), casting poly propylene (CPP), or polyurethane (PU) as the stretchable material.

The insulation member 150 may have a first region 151 that covers one long sidewall 142 of the case 140, a second region 152 that covers the other long sidewall 143 of the case 140, and a third region 153 that covers the bottom surface 141 of the case 140. For convenience of description, the long sidewall 142 that is covered by the first region 151 will be referred to as a front long sidewall, and the long sidewall 143 that is covered by the second region 152 will be referred to as a rear long sidewall.

The first region 151 may have a first sidewall extension part 151a that extends to the sidewalls 144 and 145 of the case 140. The first sidewall extension part 151a extends in the first direction (e.g., the longitudinal direction of the case 140), and may be positioned at both sides of the first region 151. The first sidewall extension part 151a may cover portions of the short sidewalls 144 and 145 of the case 140. The first sidewall extension part 151a may be connected to the third region 153.

In addition, the first region 151 may have a first upper extension part 151b that extends to the cap plate 131. The first upper extension part 151b may extend in a second direction (e.g., a height direction of the case) perpendicular to the first direction and may be positioned at one side of the first region 151. On the basis of the second direction, the first upper extension part 151b may be positioned at one end of the first region 151, and the third region 153 may be positioned at the other end of the first region 151.

The second region 152 may have a second sidewall extension part 152a that extends to the sidewalls 144 and 145 of the case 140. The second sidewall extension part 152a extends in the first direction (e.g., the longitudinal direction of the case 140) and may be positioned at both sides of the second region 152. The second sidewall extension part 152a may cover a portion of the short sidewalls 144 and 145 of the case 140. The second sidewall extension part 152a may be connected to the third region 153.

In addition, the second region 152 may have a second upper extension part 152b that extends to the cap plate 131. The second upper extension part 152b extends in the second direction (e.g., the height direction of the case 140) perpendicular to the first direction and may be positioned at one side of the second region 152. On the basis of the second direction, the second upper extension part 152b may be positioned at one end of the second region 152, and the third region 153 may be positioned at the other end of the second region 152.

The third region 153 may be positioned between the first region 151 and the second region 152. The third region 153 may have a third sidewall extension part 153a that extends to the sidewalls 144 and 145 of the case 140. The third sidewall extension part 153a extends in the first direction (e.g., the longitudinal direction of the case 140) and may be positioned at both sides of the third region 153. The third sidewall extension part 153a may cover portions of the short sidewalls 144 and 145 of the case 140. The third sidewall extension part 153a may be connected to (e.g., may extend between) the first sidewall extension part 151a and the second sidewall extension part 152a.

A cut portion 153b that extends in the first direction may be provided in the third sidewall extension part 153a. As shown in FIG. 1, when the insulation member 150 is attached to the case 140, the direction in which the cut portion 153b extends may be the height direction of the case 140.

The cut portion 153b may extend inwardly along the insulation member 150 from the end of the third sidewall extension part 153a. The cut portion (e.g., each cut portion) 153b may include two (or more) slits spaced apart from each other. The cut portion 153b may be spaced apart from the interface at where the third sidewall extension part 153a and the first sidewall extension part 151a meet and the interface at where the third sidewall extension part 153a and the second sidewall extension part 152a meet. The cut portion 153b may be a guide for inducing the folding of the insulation member 150. In some embodiments, the cut portion 153b may prevent the insulation member 150 from being crushed (or folded or wrinkled) when the first sidewall extension part 151a, the second sidewall extension part

152a, and the third sidewall extension part 153a are attached to the short sidewalls 144 and 145 of the case 140.

As such, the short sidewalls 144 and 145 of the case 140 may be covered by the first sidewall extension part 151a, the second sidewall extension part 152a, and the third sidewall extension part 153a. In some embodiments, a region at where the first sidewall extension part 151a, the second sidewall extension part 152a, and the third sidewall extension part 153a overlap and cover each other may be at the short sidewalls 144 and 145 of the case 140. In some embodiments, there may exist a region at the short sidewalls 144 and 145 of the case 140 at where the first sidewall extension part 151a, the second sidewall extension part 152a, and the third sidewall extension part 153a overlap and cover each other.

FIGS. 5A to 5G are views for describing a method of manufacturing a secondary battery according to an embodiment of the present disclosure.

A method of attaching the insulation member 150 to the case 140 will be described with reference to FIGS. 5A to 5G.

Figure 5A:
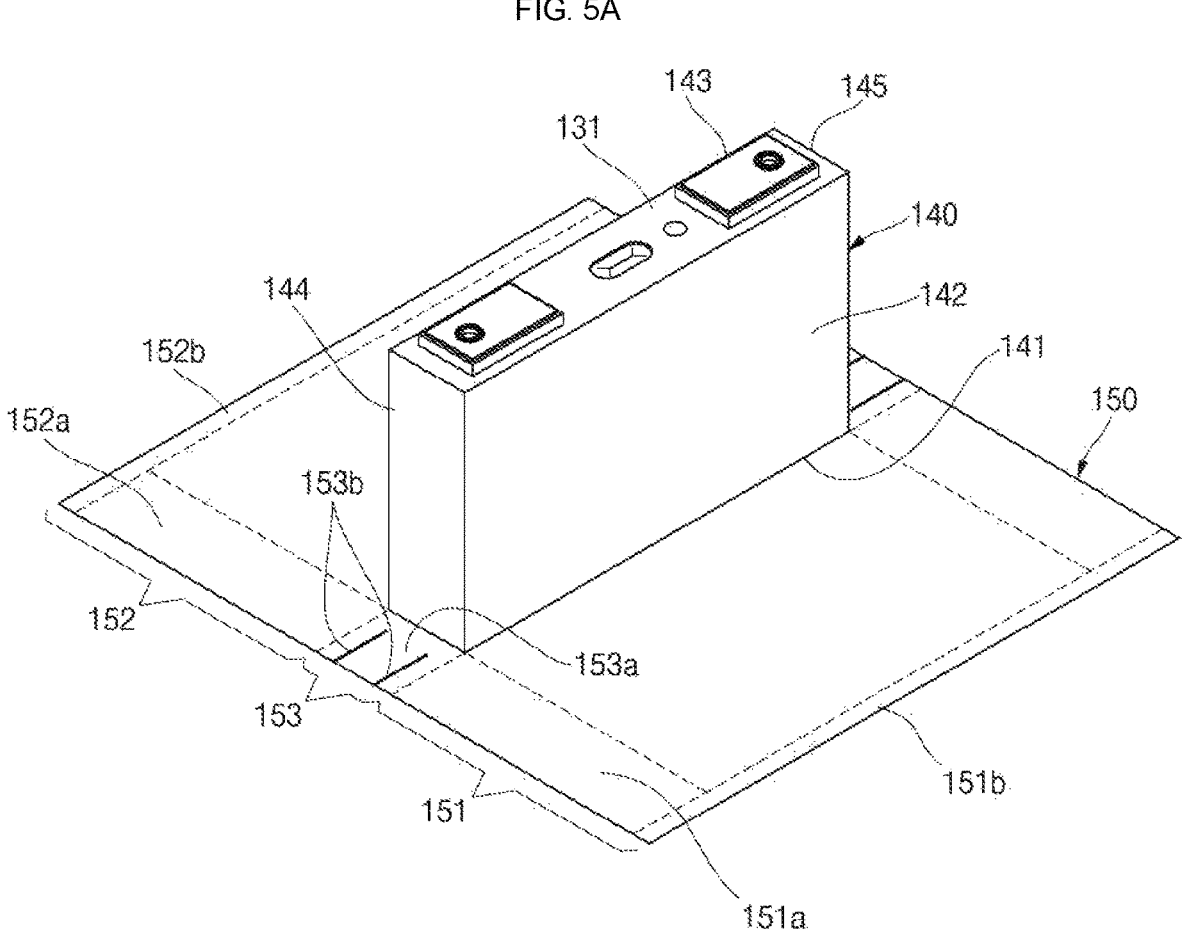
FIGS. 5A to 5G are views for describing a method of manufacturing a secondary battery according to an embodiment of the present disclosure.

As shown in FIG. 5A, the case 140, in which the electrode assembly 110 is accommodated and sealed by the cap plate 131, is arranged on the insulation member 150 so that the first layer 150a of the insulation member 150 is in contact with bottom surface 141 of the case 140. The bottom surface 141 of the case 140 may be arranged on the third region 153 of the insulation member 150.

Figure 5B:
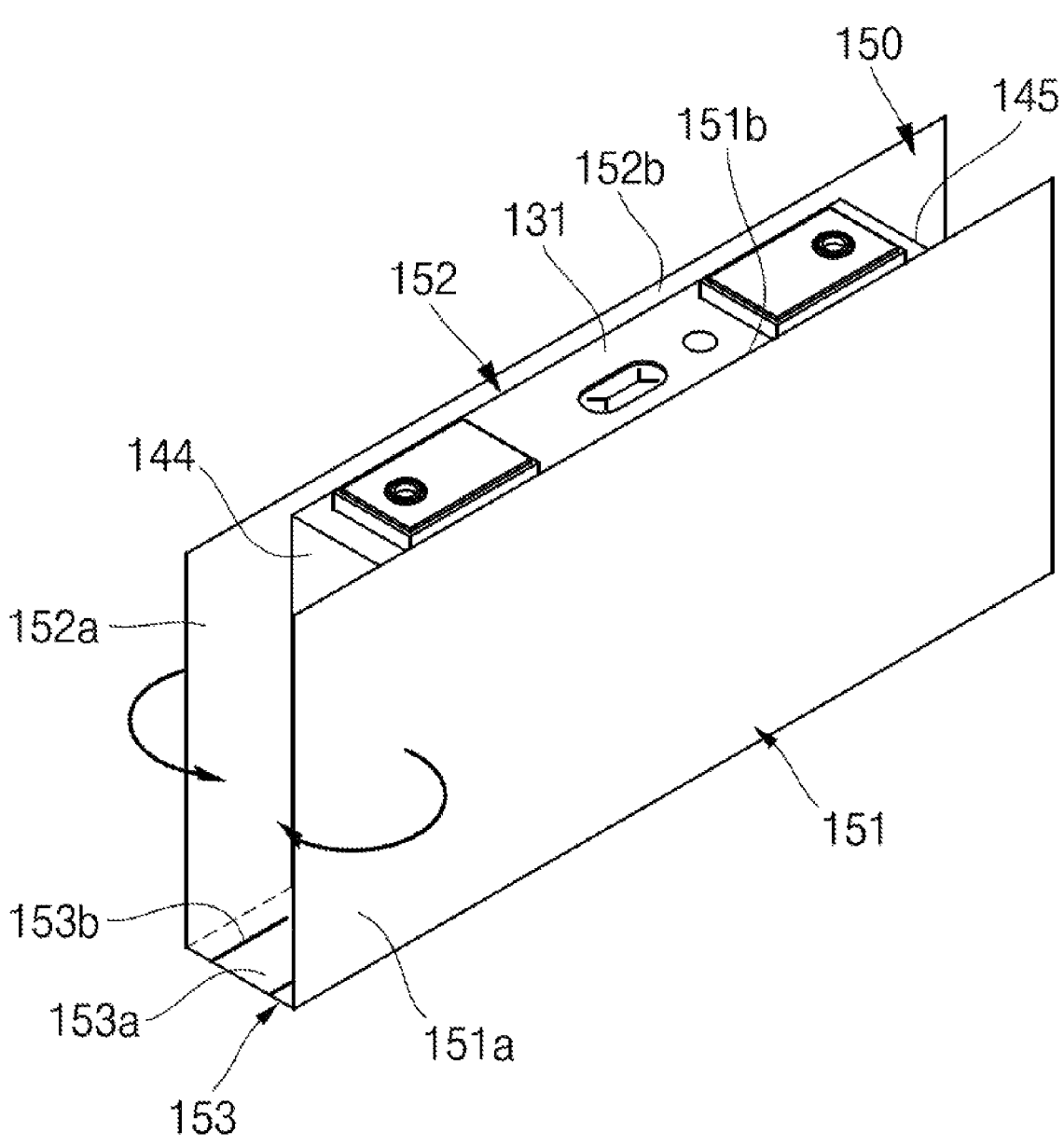

Next, as shown in FIG. 5B, by bending the first region 151 and the second region 152 of the insulation member 150, the insulation member 150 may cover the long sidewalls 142 and 143 of the case 140. The first region 151 may be attached to the front long sidewall 142 of the case 140, and the second region 152 may be attached to the rear long sidewall 143 of the case 140. The first upper extension part 151b of the first region 151 and the second upper extension part 152b of the second region 152 may protrude upwardly from (or above) the cap plate 131.

Figure 5C:
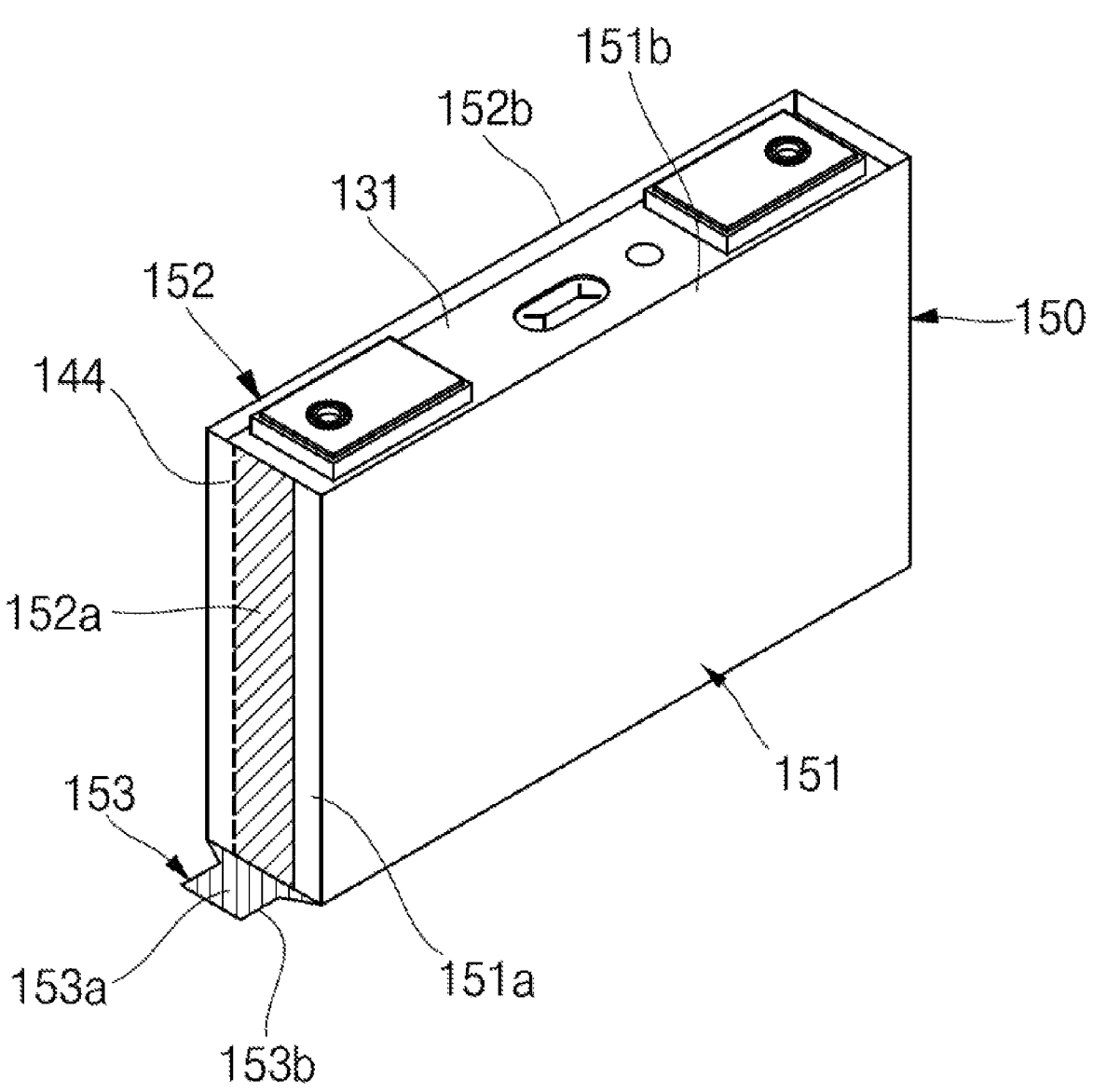

By bending the first sidewall extension part 151a of the first region 151 and the second sidewall extension part 152a of the second region 152 toward the short sidewalls 144 and 145 of the case 140, as shown in FIG. 5C, the insulation member 150 may cover the short sidewalls 144 and 145 of the case 140. In some embodiments, after the first sidewall extension part 151a is attached to the short sidewalls 144 and 145, the second sidewall extension part 152a may be attached on the first sidewall extension part 151a. Alternatively, after the second sidewall extension part 152a is attached to the short sidewalls 144 and 145, the first sidewall extension part 151a may be attached on the second sidewall extension part 152a. Accordingly, a region in which the first sidewall extension part 151a and the second sidewall extension part 152a overlap each other may be formed. Accordingly, a region in which the first sidewall extension part 151a and the second sidewall extension part 152a overlap each other may be generated.

In addition, when the first sidewall extension part 151a and the second sidewall extension part 152a are bent (or folded), the third sidewall extension part 153a may be spaced apart from the first sidewall extension part 151a and the second sidewall extension part 152a due to the cut portion 153b. For example, in the third sidewall extension part 153a, a region that is positioned inside the cut portion 153b may not be folded or moved together with the first sidewall extension part 151a and the second sidewall extension part 152a even when the first sidewall extension part 151a and the second sidewall extension part 152a are bent. In the third sidewall extension part 153a, a region that is positioned outside the cut portion 153*b* may be bent together with the first sidewall extension part 151*a* and the second sidewall extension part 152*a*.

Figure 5D:
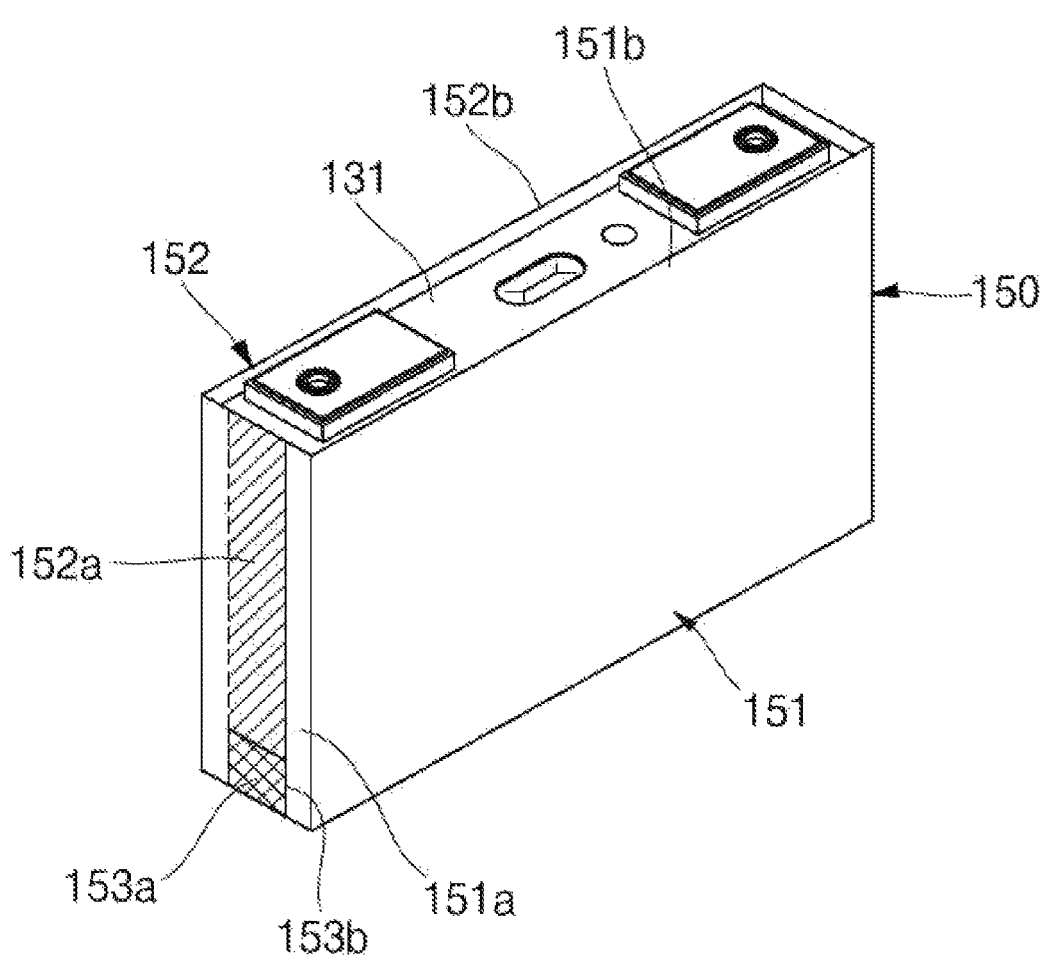

Next, by bending (or folding) the third sidewall extension part 153*a*, as shown in FIG. 5D, the short sidewalls 144, 145 of the case 140 may be covered. The third sidewall extension part 153*a* may be attached on a region of the case 140 at where the first sidewall extension part 151*a* and the second sidewall extension part 152*a* overlap each other. Accordingly, there may exist a region at the short sidewalls 144 and 145 of the case 140 at where the first sidewall extension part 151*a*, the second sidewall extension part 152*a*, and the third sidewall extension part 153*a* overlap and cover each other.

Figure 5E:
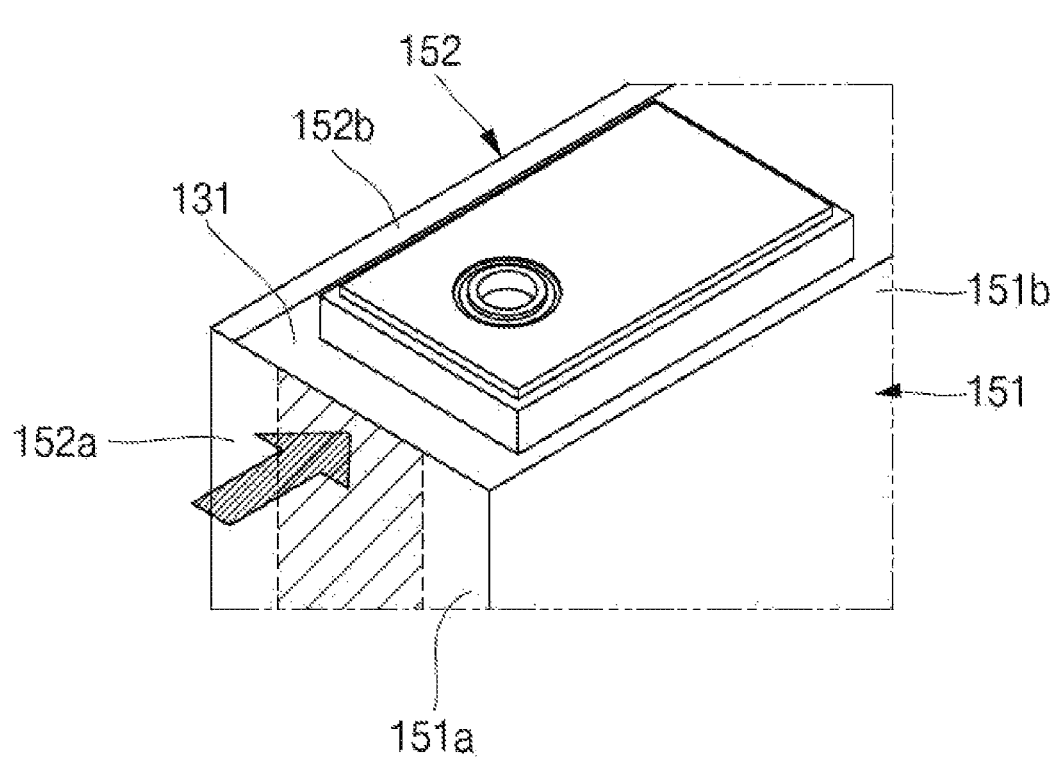
Figure 5F:
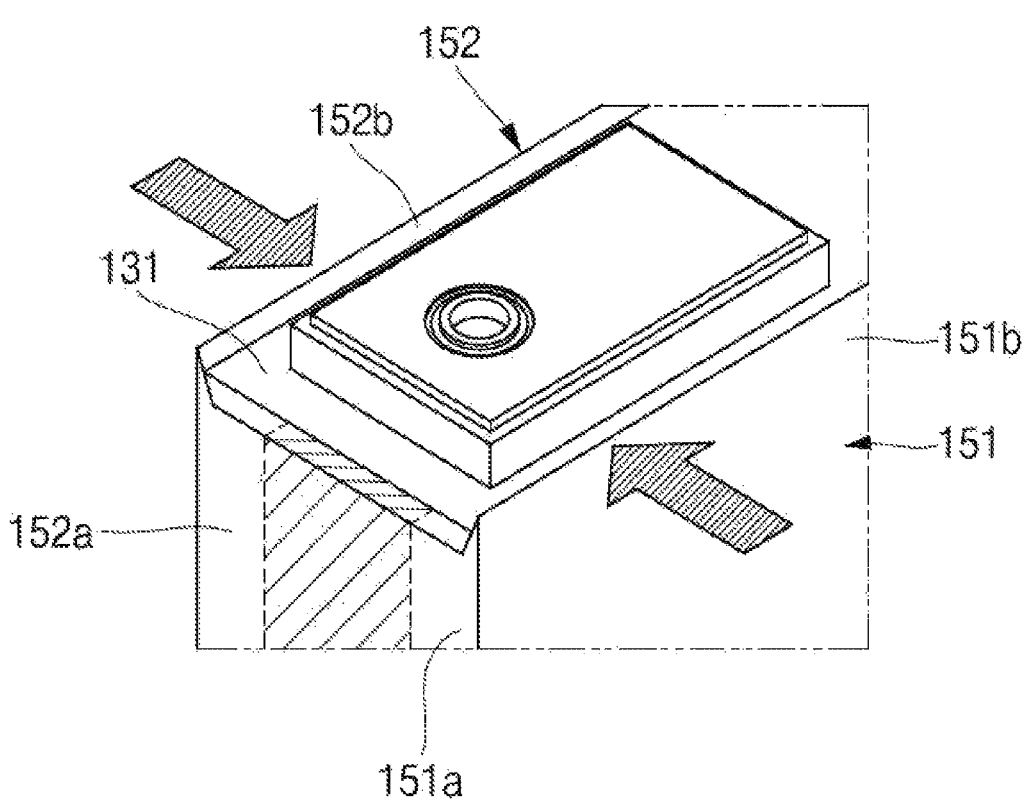
Figure 5G:
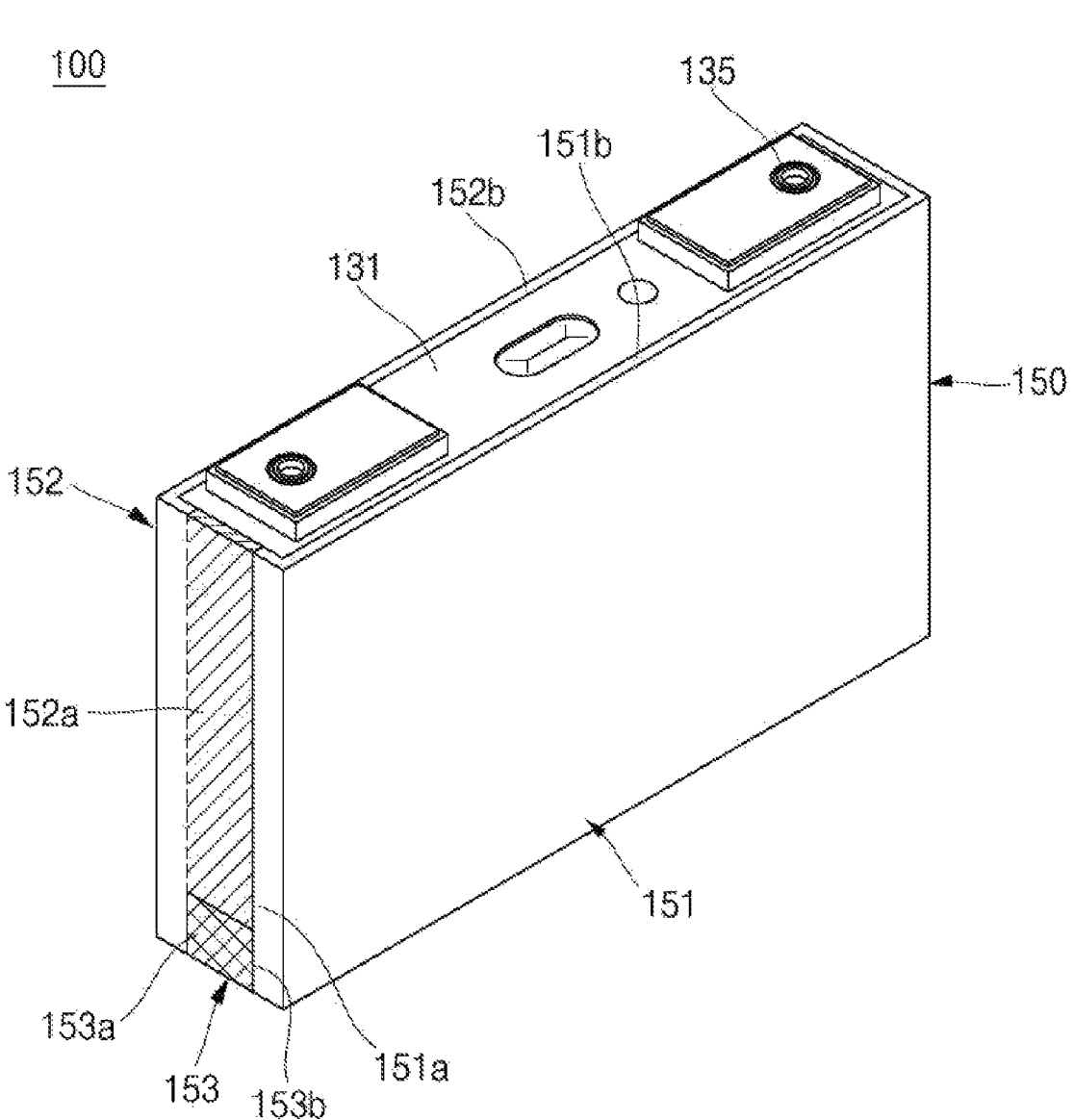

Next, as shown in FIGS. 5E to 5G, by bending the first upper extension part 151*b* of the first region 151 and the second upper extension part 152*b* of the second region 152, the edge of the cap plate 131 may be covered. In some embodiments, after bending the first upper extension part 151*b* and the second upper extension part 152*b* that protrude upwardly from the short sidewalls 144 and 145 of the case 140, the first upper extension part 151*b* and the second upper extension part 152*b* that protrude upwardly from the long sidewalls 142 and 143 of the case 140 may be bent. Alternatively, after bending the first upper extension part 151*b* and the second upper extension part 152*b* that protrude upwardly from the long sidewalls 142 and 143 of the case 140, the first upper extension part 151*b* and the second upper extension part 152*b* that protruding upwardly from the short side walls 144 and 145 of the case 140 may be bent.

Accordingly, the secondary battery 100 having the insulation member 150 attached to the outer surface of the case 140 may be provided.

As described above, in a secondary battery and a method of manufacturing the same, according to embodiments of the present disclosure, by attaching, to the outer surface of the case, an insulation member including a first layer made of a heat-resistant material, a second layer made of an insulating material, and a third layer made of a stretchable material, the safety of the secondary battery can be improved and a manufacturing process margin can be secured.

The foregoing embodiments are only some embodiments for carrying out the present disclosure, which is not limited to the embodiments described herein. It will be understood by a person skilled in the art that various changes in form and details may be made to the embodiments described herein without departing from the spirit and scope of the present disclosure as defined by the following claims and their equivalents.

What is claimed is:

1. A secondary battery comprising:
an electrode assembly;
a case accommodating the electrode assembly, the case having a bottom surface and long and short sidewalls that extend upwardly from the bottom surface;
a cap plate coupled to an upper portion of the case and sealing the case; and
an insulation member attached to an outer surface of the case, the insulation member comprising a first layer in contact with the outer surface of the case and made of a heat-resistant material, a third layer exposed to the outside and made of a stretchable material, and a second layer between the first and third layers and made of an insulating material, each of the first, second, and third layers comprising thermoplastic,
wherein a first surface of the second layer directly contacts the first layer and an opposite second surface of the second layer directly contacts the third layer.

2. The secondary battery of claim 1, wherein the insulation member has a first region and a second region covering the long sidewalls of the case and a third region between the first region and the second region and covering the bottom surface of the case.

3. The secondary battery of claim 2, wherein the first region has a first sidewall extension part extending to one of the short sidewalls of the case, the second region has a second sidewall extension part extending to the one of the short sidewalls of the case, and the third region has a third sidewall extension part extending to the one of the short sidewalls of the case.

4. The secondary battery of claim 3, wherein a portion of the one of the short sidewalls overlaps and is covered by the first sidewall extension part, the second sidewall extension part, and the third sidewall extension part.

5. The secondary battery of claim 3, wherein a cut portion of the insulating member in the third sidewall extension part has two slits spaced apart from each other.

6. The secondary battery of claim 5, wherein the cut portion is spaced apart from an interface between the first sidewall extension part and the third sidewall extension part and an interface between the second sidewall extension part and the third sidewall extension part.

7. The secondary battery of claim 2, wherein the first region has a first upper extension part extending to the cap plate, and the second region has a second upper extension part extending to the cap plate.

8. The secondary battery of claim 7, wherein the first upper extension part and the second upper extension part cover an edge of the cap plate.

\* \* \* \* \*